(12) United States Patent
Tang et al.

(10) Patent No.: US 8,414,855 B2
(45) Date of Patent: Apr. 9, 2013

(54) SPHERICAL BORON NITRIDE NANOPARTICLES AND SYNTHETIC METHOD THEREOF

(75) Inventors: Chengchun Tang, Ibaraki (JP); Yashio Bando, Ibaraki (JP); Yang Huang, Ibaraki (JP); Chunyi Zhi, Ibaraki (JP); Dmitri Golberg, Ibaraki (JP)

(73) Assignee: National Institute for Materials Science, Ibaraki (JP)

( * ) Notice: Subject to any disclaimer, the term of this patent is extended or adjusted under 35 U.S.C. 154(b) by 276 days.

(21) Appl. No.: 12/698,897

(22) Filed: Feb. 2, 2010

(65) Prior Publication Data

US 2011/0033707 A1 Feb. 10, 2011

Related U.S. Application Data

(60) Provisional application No. 61/256,220, filed on Oct. 29, 2009.

(30) Foreign Application Priority Data

Feb. 3, 2009 (JP) .................................. 2009-022174

(51) Int. Cl.
 *B32B 5/16* (2006.01)
 *C01B 21/064* (2006.01)
(52) U.S. Cl. ......................... 423/290; 428/402; 501/96.4
(58) Field of Classification Search .................. 423/235, 423/237, 245.1, 290; 428/402; 501/96.4
 See application file for complete search history.

(56) References Cited

U.S. PATENT DOCUMENTS

| | | | |
|---|---|---|---|
| 6,306,358 B1 * | 10/2001 | Yamamoto | 423/290 |
| 6,348,179 B1 * | 2/2002 | Paine et al. | 423/277 |
| 6,645,612 B2 * | 11/2003 | Pujari et al. | 428/325 |
| 6,652,822 B2 * | 11/2003 | Phillips et al. | 423/290 |
| 6,824,753 B2 | 11/2004 | Paine et al. | |
| 7,297,317 B2 * | 11/2007 | Maniccia et al. | 423/290 |
| 7,371,359 B2 * | 5/2008 | Paine, Jr. | 423/277 |
| 7,976,941 B2 * | 7/2011 | Lodyga et al. | 428/325 |
| 2002/0155052 A1 * | 10/2002 | Paine et al. | 423/277 |
| 2005/0281726 A1 * | 12/2005 | Paine | 423/277 |
| 2006/0121068 A1 * | 6/2006 | Sane et al. | 424/400 |

FOREIGN PATENT DOCUMENTS

| | | |
|---|---|---|
| EP | 396 448 | 11/1990 |
| JP | 1985-200811 A | 10/1985 |
| JP | 2000-109306 | 4/2000 |
| JP | 2001-270707 A | 10/2001 |
| JP | 2002-097004 A | 4/2002 |
| JP | 2004-182572 A | 7/2004 |

OTHER PUBLICATIONS

Tang et al, Synthetic routes and formation mechanisms of spherical boron nitride nanoparticles, Adv. Funct. Mater., vol. 18,3653-3661 (2008), available online Oct. 30, 2008.*

(Continued)

*Primary Examiner* — Hoa (Holly) Le
(74) *Attorney, Agent, or Firm* — Chen Yoshimura LLP (57) ABSTRACT

Spherical boron nitride nanoparticles having an average particle diameter of less than 50 nm is obtained by a method of synthesizing spherical boron nitride nanoparticles including the following steps; heating a mixture of boric acid ester and nitrogen gas in ammonia gas and argon gas to form reaction product; crystallizing reaction product to form precursor of spherical boron nitride nanoparticles; and, heating the precursor in inert gas.

9 Claims, 10 Drawing Sheets

OTHER PUBLICATIONS

Zhi et al, Highly thermo-conductive fluid with boron nitride nanofillers, ACS Nano. , vol. 5, No. 8, 6571-6577 (2011).*
Zhang et al., Synthesize and characterization of hollow boron-nitride nanocages, Journal of Nanomateirals, vol. 2009, Article ID 264026, doi:10.1155/2009/264026, 2009).*
Rice et al., "The Effect of Ceramic Fiber Coatings on the Room Temperature Mechanical Behavior of Ceramic-Fiber Composites" Ceram. Sci. Eng. Proc., 1984, 5, pp. 614-624.
Duclaux et al., "Structure and low-temperature thermal conductivity of pyrolytic boron nitride", Aug. 1, 1992, Physical Review B, vol. 46, No. 6, pp. 3362-3367.
Paine et al., "Synthetic Routes to Boron Nitride", Chemical Reviews, 1990, vol. 90, No. 1, pp. 73-91.
Maas et al., "Encapsulated Lanthanides as Luminescent Materials", Angew. Chem. Int. Ed., 2002, 41, No. 14, pp. 2495-2497.
Finicle, "PBN material results in better GaAs crystals, IC device advances", Industrial Research & Development, Jun. 1983, 25, pp. 113-117.
Hill et al., "Thermal Conductivity of Platelet-Filled Polymer Composites", Journal of the American Ceramic Society, Apr. 2002, 85, pp. 851-857.
Tang et al., "Thermal Conductivity of Nanostructured Boron Nitride Materials", J. Phys. Chem. B, 2006, vol. 110, No. 21, pp. 10354-10357.
Xia et al., "One-Dimensional Nanostructures: Synthesis, Characterization, and Applications", Advanced Materials, 15, No. 5, Mar. 4, 2003, pp. 353-389.
Pan et al., "Nanobelts of Semiconducting Oxides", Science, Mar. 9, 2001, vol. 291, pp. 1947-1949, downloaded from www.sciencemag.org on Jan. 14, 2010.
Matsuda et al., "Synthesis and structure of chemically vapour-deposited boron nitride", Journal of Materials Science, 21, 1986, pp. 649-658.
Fister, "AIN and BN Powders for Advanced Applications", Ceram. Sci. Eng. Proc., 1985, 6, pp. 1305-1312.
Arya et al., "Preparation, Properties and Applications of Boron Nitride Thin Films", Thin Solid Films, 157, 1988, pp. 267-282.
Economy et al., "A New Route to Boron Nitride", Inorganic Chemistry, vol. 5, No. 6, Jun. 1966, pp. 989-992.
Chopra et al., "Boron Nitride Nanotubes", Science, Aug. 18, 1995, vol. 269, pp. 966-967, downloaded from www.sciencemag.org on Jan. 15, 2010.
Laude et al., "Long ropes of boron nitride nanotubes grown by a continuous laser heating", Applied Physics Letters, May 29, 2000, vol. 76, No. 22, pp. 3239-3241.
Golberg et al., "Unique morphologies of boron nitride nanotubes", Applied Physics Letters,Jul. 16, 2001, vol. 79, No. 3, pp. 415-417.
Chen et al., "A solid-state process for formation of boron nitride nanotubes", Applied Physics Letters, May 17, 1999, vol. 74, No. 20, pp. 2960-2962.
Lee et al., "Catalyst-free synthesis of boron nitride single-wall nanotubes with a preferred zig-zag configuration", Physical Review B, 2001, vol. 64, pp. 121405-1-121405-4.
Zettl, "Mass-production of boron nitride double-wall nanotubes and nanococoons", Chemical Physics Letters, 316, Jan. 14, 2000, pp. 211-216.
Tang et al., "A novel precursor for synthesis of pure boron nitride nanotubes", Chem. Commun., 2002, pp. 1290-1291.
Chen et al., "Growth of Magnetic Yard-Glass Shaped Boron Nitride Nanotubes with Periodic Iron Nanoparticles", Advanced Functional Materials, 2007, 17, pp. 3371-3376.
Toury et al., "Boron Nitride Fibers Prepared from Symmetric and Asymmetric Alkylaminoborazines", Advanced Functional Materials, Mar. 2002, 12, No. 3, pp. 228-234.
Gu et al., "Low-Temperature Synthesis and Growth of Hexagonal Boron-Nitride in a Lithium Bromide Melt", Journal of the American Ceramic Society, May 2007, 90, pp. 1589-1591.
Wood et al., "New Borate Precursors for Boron Nitride Powder Synthesis", Chem. Mater., 2005, vol. 17, No. 7, pp. 1855-1859.
Wood et al., "Aerosol Synthesis of Hollow Spherical Morphology Boron Nitride Particles", Chem. Mater., 2006, vol. 18, No. 20, pp. 4716-4718.
Shi et al., "Synthesis and morphology control of nanocrystalline boron nitride", Journal of Solid State Chemistry, 177, 2004, pp. 721-724.
Oku et al., "Synthesis, atomic structures and properties of carbon and boron nitride fullerene materials", Materials Science and Engineering, B74, 2000, pp. 206-217.
Boulanger et al., "Concentric shelled and plate-like graphitic boron nitride nanoparticles produced by CO2 laser pyrolysis", Chemical Physics Letters, 234, Mar. 3, 1995, pp. 227-232.
Banhart et al., "The formation of curled concentric-shell clusters in boron nitride under electron irradiation", Chemical Physics Letters, 231, Dec. 16, 1994, pp. 98-104.
Han et al., "Formation of Boron Nitride (BN) Fullerene-Like Nanoparticles and (BN)xCy Nanotubes Using Carbon Nanotubes as Templates", Japanese Journal of Applied Physics, Jul. 1, 1999, vol. 38, Pt. 2, No. 7A, pp. L755-L757.
Lindquist et al., "Boron Nitride Powders Formed by Aerosol Decomposition of Poly(borazinylamine) Solutions", Journal of the American Ceramic Society, 1991, vol. 74, No. 12, pp. 3126-3128.
Pruss et al., "Aerosol Assisted Vapor Synthesis of Spherical Boron Nitride Powders", Chem. Mater., 2000, vol. 12, No. 1, pp. 19-21.
Tang et al., "Large-scale synthesis and structure of boron nitride sub-micron spherical particles", Chem. Commun., 2002, pp. 2826-2827.
Wood et al., "Aerosol Synthesis of Spherical Morphology Boron Nitride Powders from Organoborate Precursors", Chem. Mater, 2006, vol. 18, No. 6, pp. 1434-1442.
Narula et al., "Synthesis of Boron Nitride Ceramics from Oligomeric Precursors Derived from 2-(Dimethylamino)-4,6-dichloroborazine", Chem. Mater, 1990, 2, pp. 384-389.
Hagio et al., "Microstructural development with crystallization of hexagonal boron nitride", Journal of Materials Science Letters, 1997, 16, pp. 795-798.
Thamm et al., "Preparation of boron nitride thin films by microwave PECVD and their analytical characterisation", Phys. Chem. Chem. Phys., 2001, 3, pp. 5150-5153.
Strakov et al., "Kinetics and Film Properties of Boron Nitride Derived from Trimethoxyborane/Ammonia by CVD", Chem. Vap. Deposition, 2004, 10, No. 6, pp. 325-330.
Hirano et al., "Synthesis of Amorphous Boron Nitride by Pressure Pyrolysis of Borazine", Journal of the American Ceramic Society, 1989, vol. 72, No. 1, pp. 66-70.
Baraton et al., "Surface Activity of a Boron Nitride Powder: A Vibrational Study", Langmuir, 1993, vol. 9, No. 6, pp. 1486-1491.
Baraton et al., "Nanometric Boron Nitride Powders: Laser Synthesis, Characterization and FT-IR Surface Study", Journal of the European Ceramic Society, 1994, 13, pp. 371-378.
Kimura et al., "Humidity Sensitive Electrical Conduction of Polycrystalline Boron Nitride Films", Japan. J. Appl. Phys., 1978, vol. 17, No. 10, pp. 1871-1872.
Kamitsos et al., "Vibrational Spectra of Magnesium-Sodium-Borate Glasses. 2. Raman and Mid-Infrared Investigation of the Network Structure", The Journal of Physical Chemistry, 1987, vol. 91, No. 5, pp. 1073-1079.
Hubacek et al., "A Coexistence of Boron Nitride and Boric Oxide", Journal of Solid State Chemistry, 1994, 109, pp. 384-390.
Komm et al., "Synthesis and Studies of Poly(aminoborane), (H2NBH2)x", Inorganic Chemistry, 1983, vol. 22, No. 11, pp. 1684-1686.
Han et al., "Activated Boron Nitride Derived from Activated Carbon", Nano Letters, 2004, vol. 4, No. 1, pp. 173-176.
Narula et al., "Synthesis of Boron Nitride Ceramics from Poly(borazinylamine) Precursors", J. American Chemical Society, 1987, 109, pp. 5556-5557.
Hagio et al., Microstructural Development with Crystallization of Hexagonal Boron Nitride, Journal of Materials Science Letters, vol. 16, pp. 795-798, 1997. Mentioned on p. 1 of as-filed specification.
Fister, "AIN and BN Powders for Advanced Applications", Ceramic Science and Engineering Proceedings, vol. 6, pp. 1305-1312, 1985. Mentioned on p. 1 of as-filed specification.

Arya et al., "Preparation, Properties and Applications of Boron Nitride Thin Films", Thin Solid Films, vol. 157, pp. 267-282, 1988. Mentioned on p. 1 of as-filed specification.

Economy et al., "A New Route to Boron Bitride", Inorganic Chemistry (Inorg.Chem.), vol. 5, pp. 989-992, 1966. Mentioned on p. 1 of as-filed specification.

Matsuda et al., "Synthesis and Structure of Chemically Vapour-deposited Boron Nitride", Journal of Material Science (J. Mater.Sci.), vol. 21, pp. 649-658, 1986. Mentioned in as-filed specification.

Lindquist et al., "Boron Nitride Powders Formed by Aerosol Decomposition of Poly(borazinylamine) Solutions", Journal of American Ceramic Societies (J. Am.Ceram.Soc.), vol. 74, pp. 3126-3128, 1994. Mentioned on p. 1 of as-filed specification.

Pruss et al., "Aerosol Assisted Vapor Synthesis of Spherical Boron Nitride Powders", Chemistry of Materials (Chem. Mater.), vol. 12, pp. 19-21, 2000. Mentioned on p. 1 of as-filed specification.

Fang et al., "Temparature-Controlled Catalytic Growth of ZnS Nanostructures by the Evaporation of ZnS Nanopowders", Advance Functional Materials (Adv.Funct.Mater.), vol. 15, No. 1, p. 63, 2005. Mentioned on p. 2 of as-filed specification.

* cited by examiner

FIG.10

SPHERICAL BORON NITRIDE NANOPARTICLES AND SYNTHETIC METHOD THEREOF

This application claims the benefit of Provisional Application of Ser. No. 61/256,220, filed on Oct. 29, 2009, and claims the benefit of the Japanese Patent Application No. 2009-022174, filed on Feb. 3, 2009 in Japan.

BACKGROUND OF THE INVENTION

1. Field of the Invention

The present invention relates to spherical boron nitride nanoparticles which have nano meter size diameter, and synthetic method thereof.

2. Description of the Related Art

Some methods for synthesizing boron nitride particles are known, for example, high-temperature syntheses described in J. Mater. Sci. Lett., vol. 16, 795 (1997) and Ceram. Sci. Eng. Proc., vol. 6. 1305 (1985); chemical vapor deposition synthesis described in Thin Solid Films, vol. 157. 267 (1988); and polymer calcinating synthesis described in Inorg. Chem., vol. 5. 989 (1966). In particular, a method of reacting boron halogenide with ammonia, described in EP396448 A is well known. In this reaction, boron trihalide and ammonia are heated at low temperature for synthesizing boron nitride particles. Lindquist et al disclosed a method for synthesizing spherical boron nitride nanoparticles by calcinating polyborazinylamine which is dissolved in liquid ammonia; see J. Am. Ceram. Soc., vol. 74. 3126. (1994). Recently a method of spherical boron nitride particles having average diameter of 1-2 micrometers were reported. In this method the spherical boron nitride nanoparticles were synthesized from boric acid and ammonia by reacting at high temperature; see Chem. Mater., vol. 12, 19 (2000). Synthetic methods for boron nitride nanotube are disclosed, for example, in JP 2000-109306 A, JP2001-270707 A, and JP 2002-097004 A, although they are not spherical particles of boron nitride.

Moreover, a method for synthesizing spherical boron nitride nanoparticles having average diameter of 100-180 nm was disclosed in JP 1985-200811 A. In this method, carbon and boron oxide obtained by hydrolysis of borate ester are heated in nitrogen-containing compound atmosphere to synthesize spherical boron nitride nanoparticles having average diameter of 100-180 nm. Furthermore a method for synthesizing spherical boron nitride nanoparticles having average diameter of 50-100,000 nm was disclosed in U.S. Pat. No. 6,824,753. The method comprises a first step of heating organic boron precursor, inactive gas and nitriding agent at 600-1800 degrees C. to obtain powder of $BN_xO_yC_z$; and a second step of heating the obtained powder and further added nitriding agent at 600-1800 degrees C. Also the inventors filed a patent application about a method for synthesizing spherical boron nitride nanoparticles having submicron size and high purity from trimethyl borate and ammonia. The obtained spherical boron nitride nanoparticles contained a little amount of oxygen, see JP 2004-182572 A. However, above references did not be carried out study on manufacturing conditions and detailed method, and diameter of obtained spherical boron nitride nanoparticles were large size. Accordingly, in the case spherical boron nitride nanoparticles having large diameter were used in a composite material, as fillers, the thermal conductivity was not improved well enough. On the other hand, it is not in the same technical field of spherical boron nitride nanoparticles, but some reports showed different crystal morphologies, for example nano belts or nano rods. The reports suggest possibility of new materials having new form and/or small diameter if manufacturing conditions and/or detailed method were studied in detail, see Adv. Funct. Mater., vol. 15. No. 1, vol. 63, 2005.

SUMMARY OF THE INVENTION

It is known that spherical boron nitride nanoparticles having small diameter are desirable to perform high thermal conductivity, in the case they are used as fillers in a polymer composite and so on. Also it is known that the smallest diameter of the spherical boron nitride nanoparticles is 50 nm, at present. If spherical boron nitride nanoparticles having less than 50 nm are obtained, possible application of spherical boron nitride nanoparticles would be expanded. The purpose of the present invention is to provide spherical boron nitride nanoparticles of which average diameter is less than 50 nm.

The inventors completed the present invention based on inventors finding that the spherical boron nitride nanoparticles having a practical use are obtained by decreasing oxygen content in spherical boron nitride nanoparticles as much as possible and by improving crystallization form of spherical boron nitride nanoparticles.

Firstly, the present invention provides spherical boron nitride nanoparticles of which average particle diameter is less than 50 nm.

Secondly, the present invention provides spherical boron nitride nanoparticles of which average particle diameter is less than 30 nm.

Thirdly, the present invention provides spherical boron nitride nanoparticles of which average particle diameter is less than 50 nm or less than 30 nm, wherein oxygen content is less than 1 wt %.

Fourthly, the present invention provides a method for synthesizing spherical boron nitride nanoparticles comprising: heating a mixture of boric acid ester and nitrogen gas in ammonia gas and argon gas to form a reaction product; crystallizing the reaction product to form a precursor of spherical boron nitride nanoparticles; and heating the precursor in inert gas.

Fifthly, the present invention provides a method for synthesizing spherical boron nitride nanoparticles comprising: heating a mixture of boric acid ester and nitrogen gas in ammonia gas and argon gas to form a reaction product; crystallizing the reaction product to form precursor of spherical boron nitride nanoparticles; and heating the precursor in inert gas, wherein the precursor is presented in the form of $B(OCH_3)_{3-x}H_{3-x}N$ in which x is 2.7.

Sixthly, the present invention provides a method for synthesizing spherical boron nitride nanoparticles, wherein the crystallizing temperature is 50 degree C. or less.

According to the present invention, the spherical boron nitride nanoparticles of the present invention have an average of diameter less than 50 nm are provided. And the method of the present invention produces the spherical boron nitride nanoparticles have an average of diameter less than 50 nm with yield improvement.

BRIEF DESCRIPTION OF DRAWINGS

In the drawings:

In FIG. 2, (a) indicates the pattern of XRD of the precursor, $(B(OCH_3)_{3-x}H_{3-x}N)$ (x=2.7), obtained in the example, (b) indicates the pattern of X-ray diffraction (XRD) of a product which the precursor was heat-treated in an ammonia gas in the example, and (c) indicates the pattern of X-ray diffraction (XRD) of the resultant, after the precursor was heat-treated in argon gas in the example.

In FIG. 3, (a) indicates the pattern of FTIR of the precursor, $(B(OCH_3)_{3-x}H_{3-x}N)$ (x=2.7), obtained in the example, (b) indicates the pattern of FTIR of a product which the precursor was heat-treated in an ammonia gas current in the example, (c) indicates the pattern of FTIR of the resultant, after the precursor was heat-treated in argon gas in the example.

FIG. 4 (a) is an image of the scanning electron microscope (SEM) of the precursor $(B(OCH_3)_{3-x}H_{3-x}N)$ (x=2.7) obtained in the example. FIG. 4 (b) is an image of SEM of a product which the precursor was heat-treated in an ammonia gas current in the example. FIG. 4 (c) is an image of SEM of the resultant, after the precursor was heat-treated in argon gas in the example.

DETAILED DESCRIPTION OF THE PREFERRED EMBODIMENTS

Hereinafter, embodiments of the present invention will be described with the drawings.

The spherical boron nitride nanoparticles of the present invention possess the average particle diameter of less than 50 nm. In this description, the average particle diameter was calculated from a maximum diameter and a minimum diameter of the spherical boron nitride nanoparticles.

In addition, both thermal conductivity and crystallization depend on the impurity oxygen content in the spherical boron nitride nanoparticles. The present invention of spherical boron nitride nanoparticles possesses an average particle diameter being less than 50 nm and an oxygen content being less than 1 wt %.

A synthetic method for the spherical boron nitride nanoparticles includes a first step and a second step as follows.

The first step comprises: heating a mixture of boric acid ester and nitrogen gas in an atmosphere of ammonia gas and argon gas to obtain reaction product; crystallizing the reaction product to form a precursor of spherical boron nitride nanoparticles.

The precursor of spherical boron nitride nanoparticles is considered to be presented in the form of $B(OCH_3)_{3-x}H_{3-x}N$.

The second step comprises, heating the precursor in inert gas. In the second step, oxygen is removed from the precursor and the spherical boron nitride nanoparticles having the average particle diameter less than 50 nm is obtained.

Crystallization depends on the cooling temperature, and the particle diameter becomes smaller if the difference of heating temperature and cooling temperature is enlarged. However, since crystallization occurs immediately and then the reaction product becomes a solid rapidly, crystal growth is inhibited if there are great differ between the heating temperature and the cooling temperature. In the first step, since heating temperature is in the range of $6 \times 10^2$ to $15 \times 10^2$ degree C., it is preferred to control the cooling temperature at between about 50 degree C. and 0 degree C. As the range of the cooling temperature is enough lower than the melting point of $B(OCH_3)_{3-x}H_{3-x}N$, generated crystal cannot further aggregate together.

The preferred materials used for the method of the present invention are boric acid ester and ammonia gas.

For boric acid ester, trimethyl borate, triethyl borate, tripropyl borate and tributyl borate are mentioned for example.

As to nitrogen source, ammonia and nitrogen gas are mentioned. Also, nitrogen/hydrogen mixture, alkylamine, hydrazine, cyanamide, dicyanamide and mixture of thereof can be used.

Mix flow gas of nitrogen and argon is preferred to transfer the reaction product to cooling room.

As mentioned above, to obtain the reaction product heating temperature is in the range of $6 \times 10^2$ to $15 \times 10^2$ degree C. More preferably, the range is $8 \times 10^2$ to $12 \times 10^2$ degree C. If the heating temperature is over $15 \times 10^2$ degree C., diameter of the spherical boron nitride nanoparticles will be large because of aggregation. If the heating temperature is under than $6 \times 10^2$ degree C., yield of reaction product will be low level.

In the second step, the precursor is heated in inert gas flow and the precursor is converted into spherical boron nitride nanoparticles having the average particle diameter less than 50 nm. Also in the second step, oxygen is removed from the precursor by heating in inert gas flow. Inert gas is selected from He, Ne, Ar, Kr and Xe. Especially, argon gas is preferable.

The precursor is converted into the spherical boron nitride nanoparticles of the present invention without collapse of crystal by heating in the temperature range between exceeding the heating temperature of the first step and under the melting point of the boron nitride. By the conversion reaction progresses, the crystal quality of the spherical boron nitride is improved because the ratio of boron nitride content increases.

The conversion temperature in the second step is preferred between $12 \times 10^2$ degree C. and $16 \times 10^2$ degree C.

If the conversion temperature is higher than $16 \times 10^2$ degree C., particles are aggregated to form large sized particles. On the contrary, the conversion temperature is lower than $12 \times 10^2$ degree C., oxygen remains in the spherical boron nitride nanoparticles.

Reaction time for heating in the second step is 1 to 20 hours, preferably 2 to 10 hours, more preferably 3 to 6 hours. If smaller particle is desired or if conversion temperature is higher, the reaction time may be shortened.

In the case the reaction time is shorter than 1 hour, remnant impurity oxygen in the spherical boron nitride nanoparticles increase.

EXAMPLES

The example of the present invention will be explained below.

Example 1

Figure 1:
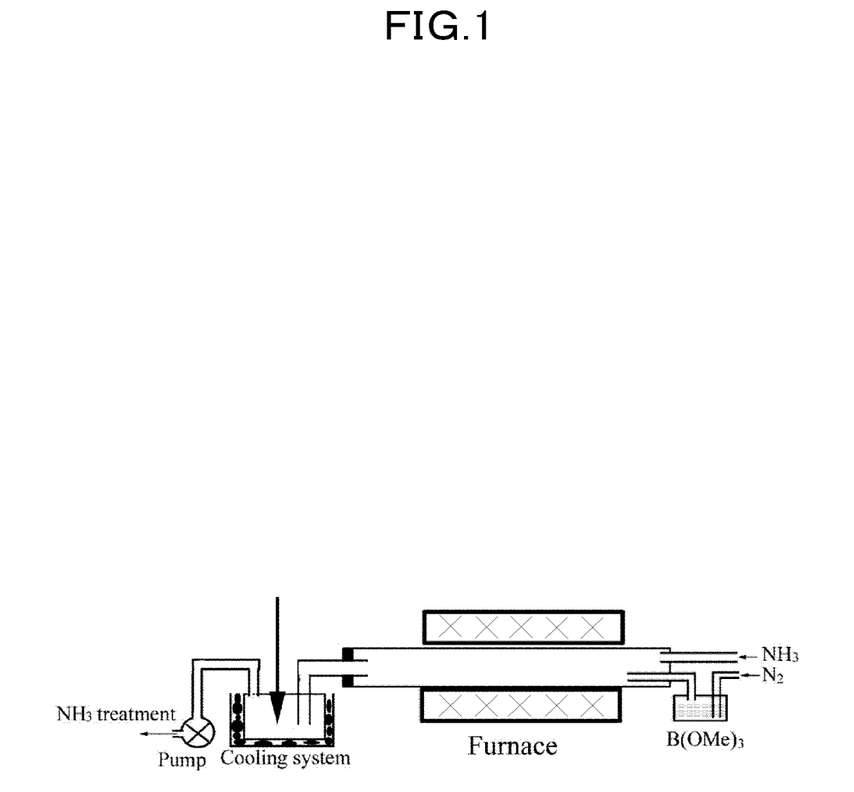
FIG. 1 is a view illustrating an apparatus used in the example of the present invention.

FIG. 1 illustrates a horizontal tubular electric furnace used for synthesizing the precursor in the first step. The furnace is composed of a silica tube and its outer tube. The length of the silica tube arranged in this tubular electric furnace is 1.5m, and its diameter is 50 mm. The length of the outer tube is 1 m. A cooling trap of 2 liter capacity is arranged at the downstream end of the silica tube and temperature of the cooling trap was kept at about 3 degree C. On the other hand, a container of 500 mL capacity is arranged at the up-stream end of the silica tube, in which a gas introduction pipe is attached to the container. In order to make the flow condition for introductory gas smoothly, the silica tube was kept reduce pressure of 720 Torr.

200 mL trimethyl borate of 99% purity, produced by Wako Pure Chem. Industry was put into the container of 500 mL, ammonia gas of flow 250 sccm, nitrogen gas of flow 800 sccm and the argon gas of flow 1000 sccm were introduced into the silica tube to react them. The reaction temperature was kept at 980 degree C. at the center of the silica tube for 6 hours. White fluffy clouded product was accumulated in the cooling trap which the arrow points in the FIG. 1. The total amount of the white reaction product was 40 g.

Figure 2:
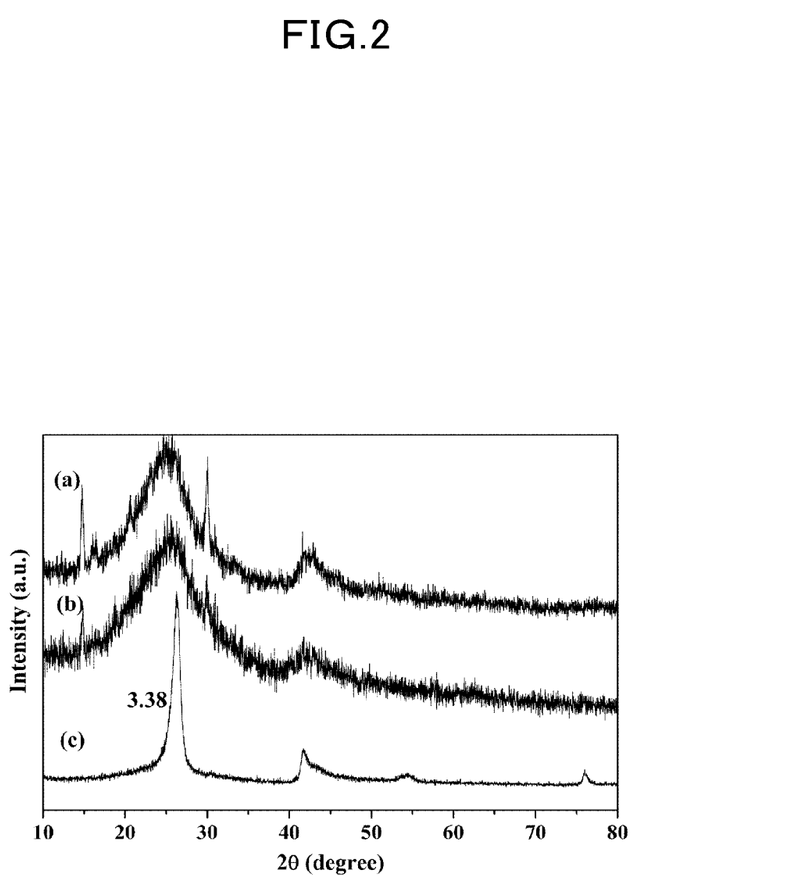
FIG. 2 is the result of X-ray diffraction (XRD) of the example.

In the FIG. 2, (a) shows the pattern of X-ray diffraction (XRD) of the white reaction product. The two broad diffraction peaks corresponding to the (002) plane and (100) plane appear at 2 θ of ~25° and ~41°, which indicates the existence of B—N containing phases in solid. The sharp peaks in the pattern is assigned to $B_2O_3$ or $B(OH)_3$.

Figure 3:
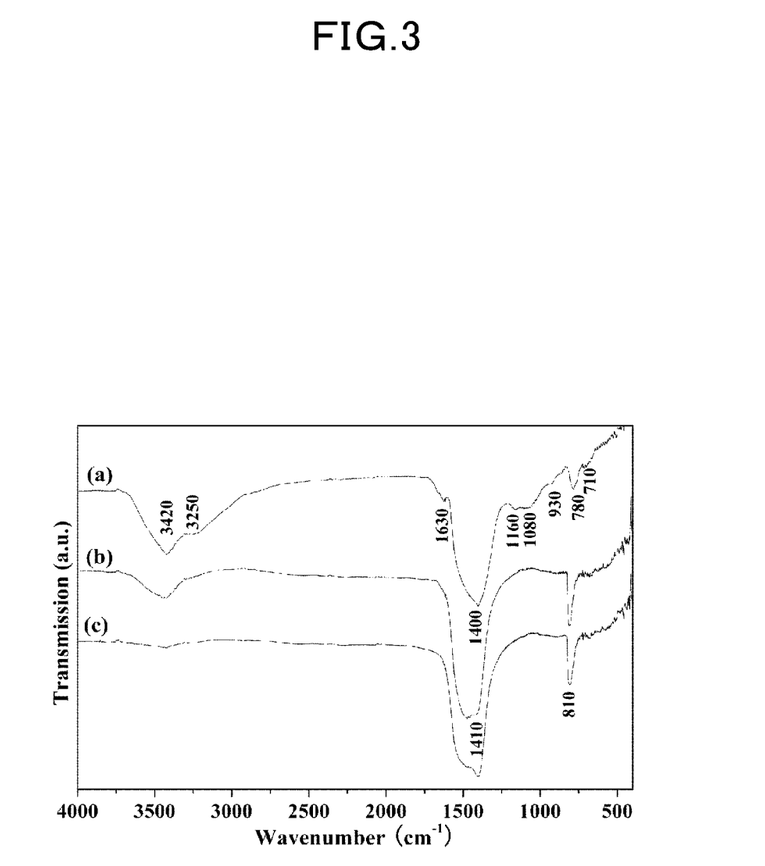
FIG. 3 is the result of the Fourier transform infrared spectroscopy (FTIR) in the example.

In FIG. 3, (a) shows Fourier transform infrared spectroscopy (FTIR) of the white reaction product. Some vibration bands of 3420 $cm^{-1}$ and 3250 $cm^{-1}$ corresponding to B—$NH_2$ and B—OH, 1630 $cm^{-1}$ corresponding to C, 1400 $cm^{-1}$ corresponding to BN, 1160 $cm^{-1}$ corresponding to B—N—O, 1080 $cm^{-1}$ corresponding to CO, 930 $cm^{-1}$ corresponding to B—N—O, and 780 $cm^{-1}$ corresponding to BN are observed.

The white reaction product was analyzed by Elemental analysis for content of C, N, and H. Element compound of B was analyzed by inductively-coupled plasma emission spectrometry and element compound of O was calculated. It is considered that the white reaction product is presented in form of $B_{1-a}O_{0.4+b}C_{0.3+c}CH_{2+d}N$, wherein values of a, b, c and d are less than 1. Since the white reaction product is hygroscopic, it is thought to be presented in form of $B(OCH_3)_{3-x}H_{3-x}N$, wherein the value x is 2.7. The white reaction product of $B(OCH_3)_{3-x}H_{3-x}N$, with the value x of 2.7, is a precursor of the spherical boron nitride nanoparticles of the present invention.

Figure 4:
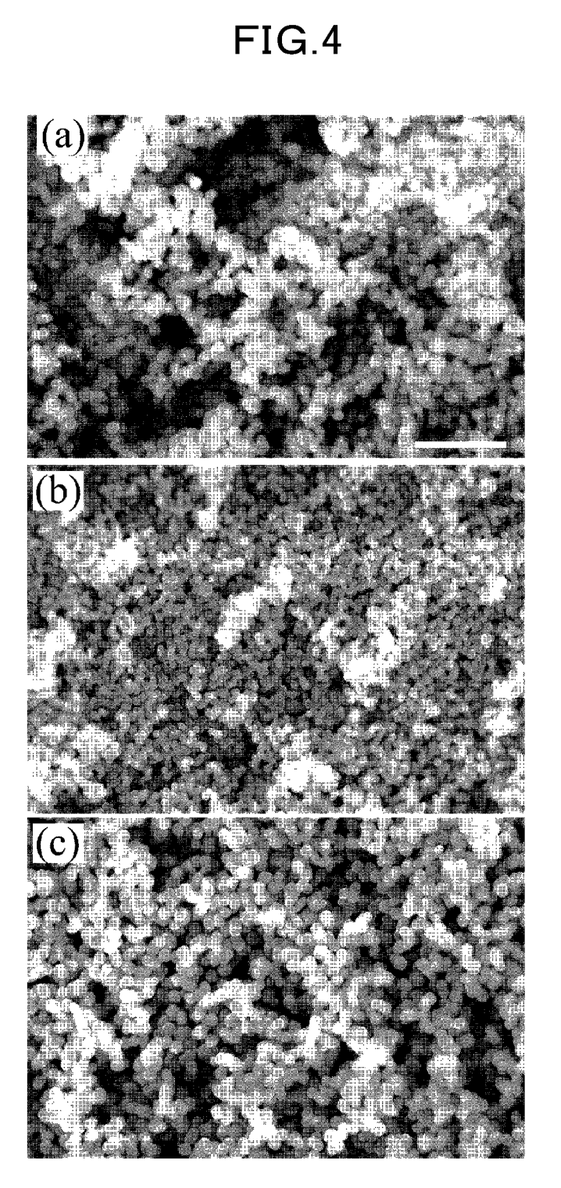

In FIG. 4, (a) is an image showing the scanning electron microscope image (SEM) of the white reaction product. The diameter of a particle is from 10 to 50 nm, and it turned out that the average diameter was a 30 nm of spherical particles; hereinafter the white reaction product is called as precursor.

The precursor was heated at 1400 degree C. in ammonia gas flow of 1000 sccm for 5 hours in the furnace.

In FIG. 4, (b) is an image showing the scanning electron microscope image (SEM) of the product which the precursor was heat-treated in ammonia gas, hereinafter called "ammonia treated product". From the image, the ammonia treated product was observed as spherical particles having comparatively smooth surface. And the diameter of the ammonia treated product was similar to the diameter of the precursor.

In the FIG. 2, (b) shows the pattern of X-ray diffraction (XRD) of the ammonia treated product. Since the pattern shows a broad pattern, the ammonia treated product involves impurities, such as boron oxide or boric acid.

In FIG. 3, (b) shows Fourier transform infrared spectroscopy (FTIR) of the ammonia treated product. Some vibration bands of 3500 $cm^{-1}$ corresponding to B—OH, 1410 $cm^{-1}$ and 810 $cm^{-1}$ corresponding to BN, 900-1200 $cm^{-1}$ corresponding to B—N—O are observed. However, 1630 $cm^{-1}$ corresponding to CO disappeared. It indicates that the oxygen could not be removed fully, although the C containing group and H containing group are effectively removed during hearing in ammonia gas.

The precursor contains 0.1 wt % of C, 0.2 wt % of H and 11.5 wt % of O, analyzed by Elemental analysis.

The elemental analysis indicates that the heating in ammonia gas is not effective to remove O content from the precursor.

The precursor was heated at 1400 degree C. in argon gas flow, in stead of ammonia gas, of 1000 sccm for 5 hours in the furnace; hereinafter called "inert gas treated product".

In the FIG. 2, (c) shows the pattern of X-ray diffraction (XRD) of the inert gas treated product. The pattern shows sharp peak, and since the interlayer distance of the (002) plane becomes 0.338 nm, which is very close to the 0.333 nm of the standard hexagonal BN, thus indicating the formation of a highly crystallized product.

The elemental analysis reveals residual trace of 0.6 wt % of O, 0.2 wt % of C and 0.1 wt % of H, all of element compounds were less than 1 wt %.

In FIG. 3, (c) shows Fourier transform infrared spectroscopy (FTIR) of the inert gas treated product. It is understood that the boron nitride is produced because there are 1410 $cm^{-1}$ and 810 $cm^{-1}$ corresponding to BN. It indicates that the oxygen could be removed effectively.

In FIG. 4, (c) is an image showing the scanning electron microscope image (SEM) of the product of argon gas treated product. From the image, the inert gas treated product was observed as spherical particles which have comparatively smooth surface and the diameter of the inert gas treated product has an average diameter of 30 nm. In addition, the value of specific surface area was calculated with 52.7 $m^2/g$ by the measured nitrogen adsorption-desorption isotherm.

The spherical boron nitride nanoparticles of the present invention promote applications of boron nitride nanoparticles, for example materials in fillers and thermal interface materials, based on their remarkable insulating, mechanical and rheological properties. In fact uniformly incorporated the spherical boron nitride nanoparticles of the present invention and/or polymer system has the effective improved thermal properties.

Comparative Example 1

Figure 5:
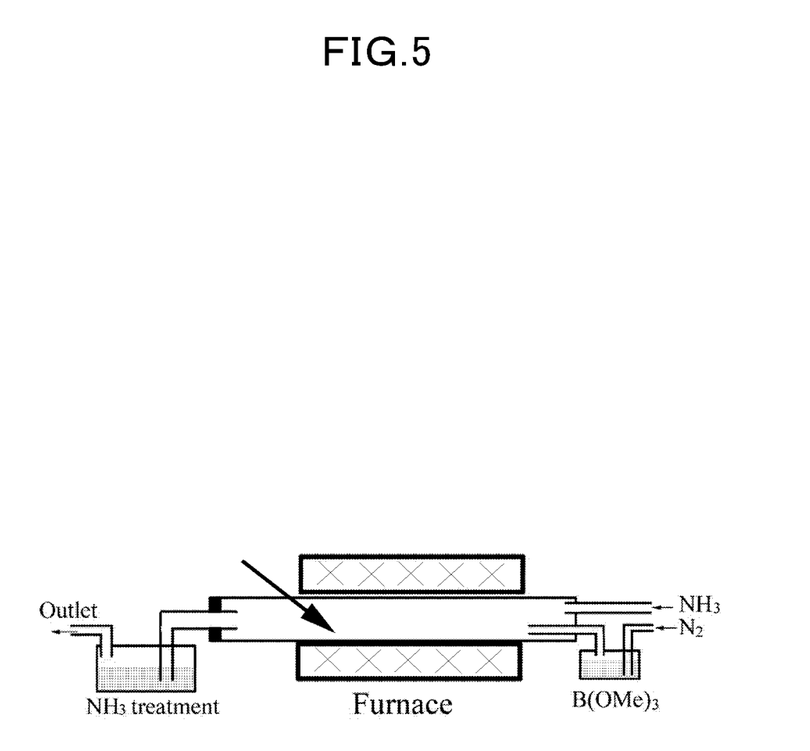
FIG. 5 is a view illustrating a reaction apparatus used for the comparative example.

The first step reaction was performed at 980 degree C. using an apparatus which does not have the cooling trap shown in FIG. 5 instead of the equipment of FIG. 1 White solid product was accumulated on the position of 25 cm down the stream from the central part of the apparatus, and temperature of accumulated position was 600 degree C.

Figure 6:
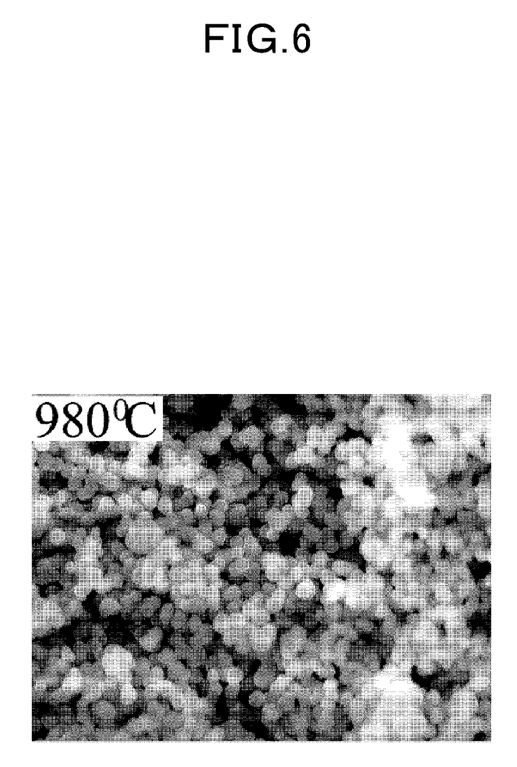
FIG. 6 is SEM image of the spherical boron nitride nanoparticles obtained in the comparative example 1.

In FIG. 6 shows the scanning electron microscope image (SEM) of the white solid product of Comparative example. Observed from the figure, the white solid product is spherical particles contained the particle of a diameter covering the range of 5-400 nm, and that average diameter is 90 nm which is lager than the example.

The white solid product was heated at 1400 degree C. in ammonia gas for 5 hours. The ammonia gas treated product was analyzed by elemental analysis Since the elemental analysis shows residual content of 6.3 wt % of O and 0.3 wt % of C, it is understood that the heating in ammonia gas is not effective to remove 0 content from the white solid product.

Comparative Example 2

Figure 7:
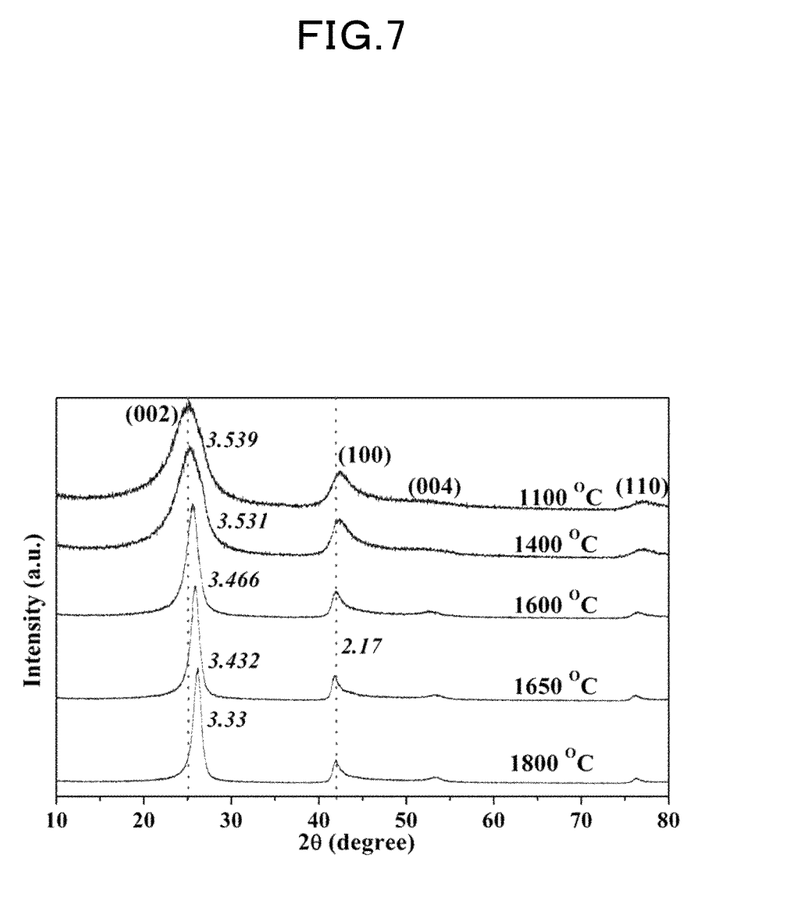
FIG. 7 is the result of X-ray diffraction (XRD) of the comparative example 2.

The precursor was heated in ammonia gas at different temperatures. The XRD patterns are shown in FIG. 7. It shows that the crystal quality is improved with an increase of the heating temperature, and the interlayer (002) distance reduces from the starting 0.358 nm to 0.343 nm after heating at 1650 degree C. However, even after 1650 degree C. healing the distance is larger than 0.333 nm in a well-structured hexagonal boron nitride. Elemental analyses indicate that the C and H contents are rapidly reduced to less than 1 wt % at 1100 degree C., but that of O still remains constant and higher than 5 wt % at 1650 degree C., which indicates that the distance difference should be attributed to the oxygen impurities. It is noted that the (100) interlayer distance of ~0.217 nm is almost identical in all samples, independent of the heating temperature. Therefore, it is reasonable to assume that oxygen resides between layers, and chemically bonds with B in a hexagonal network structure. The chemical bonding is strong, so that it is difficult to convert the oxygen into the nitride during heating in ammonia, even at a temperature higher than 1650 degree C. The complete nitridation temperature must be increased to an extremely high value of >1800 degree C. As shown in the XRD patterns, the (002) distance becomes ~0.33 nm at this temperature, in accord with the standard interlayer distance of a boron nitride crystal.

Figure 8:
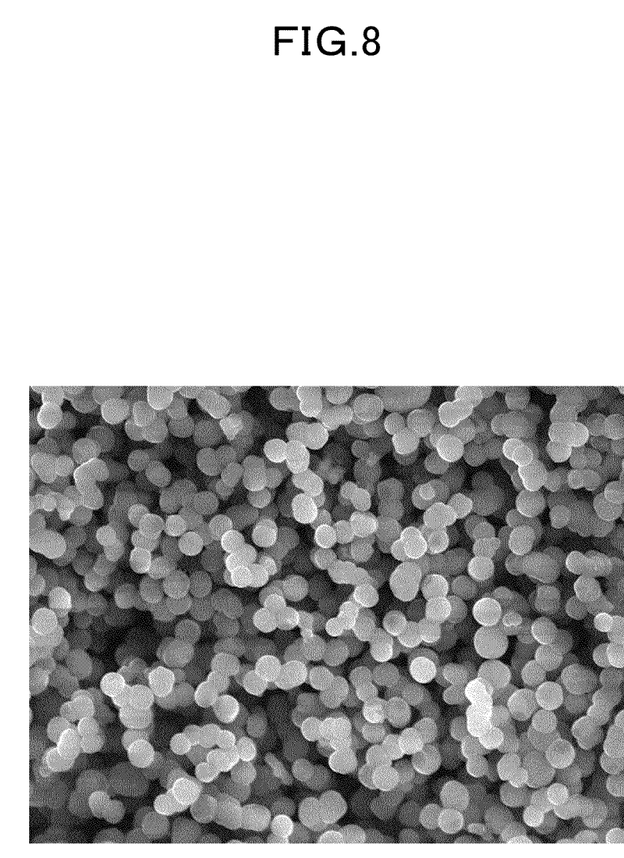
FIG. 8 is SEM image of the Boron Nitride Nanoparticles heated a 1400 degree C. of comparative example 2.
Figure 9:
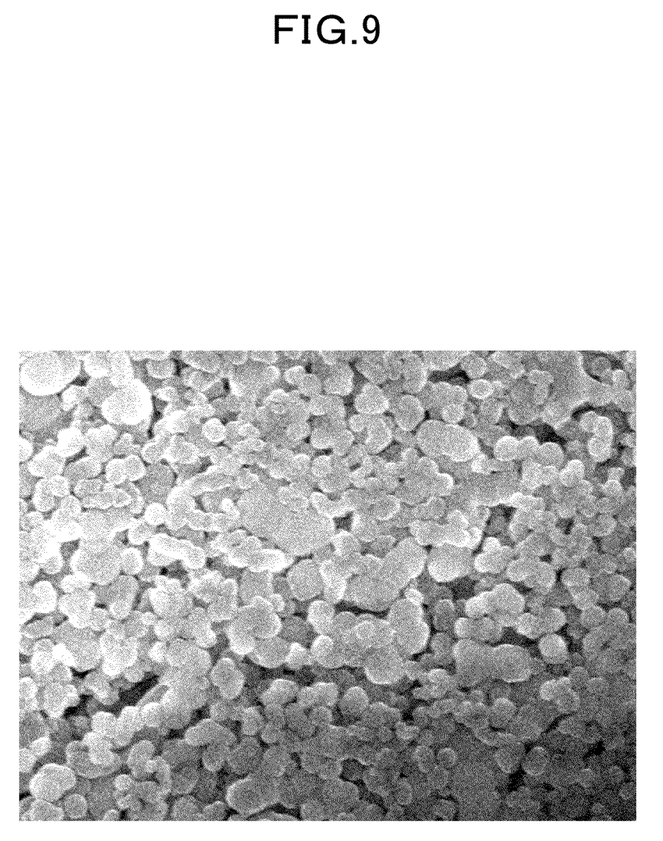
FIG. 9 is SEM image of the Boron Nitride Nanoparticles heated a 1650 degree C. of comparative example 2.
Figure 10:
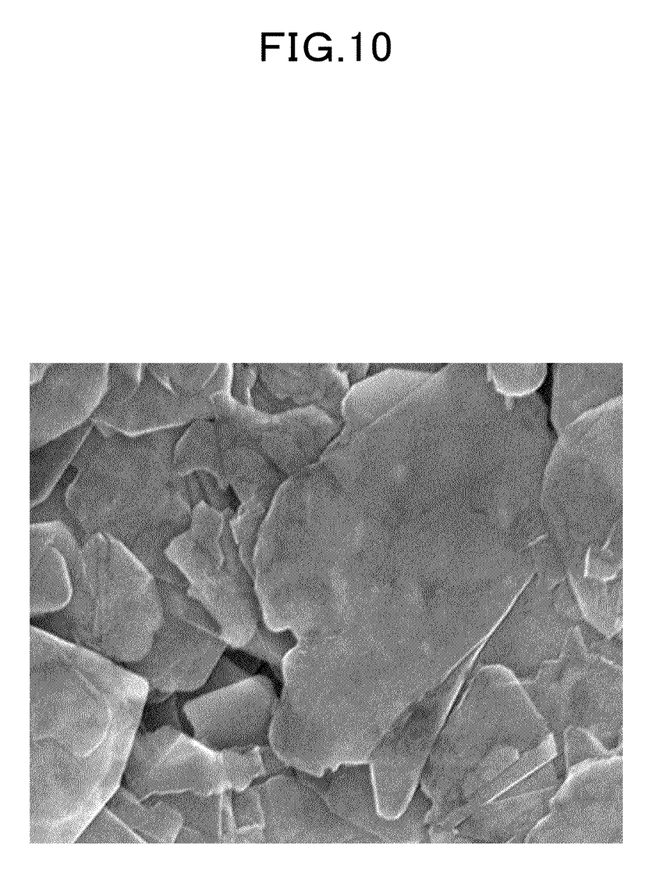
FIG. 10 is SEM image of the Boron Nitride Nanoparticles heated a 1800 degree C. of comparative example 2.

The heating procedure under ammonia has also influenced the morphology of the spherical boron nitride particles. SEM examination indicates that the spherical morphology is retained when the heating temperature is lower than 1600 degree C., and the particle diameter increases slightly. A typical SEM image of a product heated at 1400 degree C. is shown in FIG. 8. The particles are basically mono-dispersed with a diameter that slightly increases from ~50 to ~100 nm. This observation is consistent with our previous studies and is in line with the heating effect on the formation of spherical boron nitride nanoparticles synthesized by an aerosol-assisted procedure. However, the extremely high heating temperature used for the oxygen removal remarkably results in particle aggregation. In FIG. 9, there are several spheres aggregated to form a larger particle with an irregular shape after heating at 1650 degree C. The spherical morphology is fully collapsed after heating at 1800 degree C. (see FIG. 10), when all oxygen species are removed under a high-temperature ammonothermal reaction. The experimental observations imply that presence of oxygen plays an important role in the homogeneously structured boron nitride particle formation.

INDUSTRY APPLICABILITY

Since the spherical boron nitride nanoparticles have minimized diameter and less oxygen content, the use of application can be expanded such as high-thermal conductivity fillers to a polymer composite, electric insulation parts, implement for ceramic calcination, a heat dissipation sheet, and so on.

CITATION LIST

Patent Documents (1) EP396448
(2) JP 2000-109306 A
(3) JP 2001-270707 A
(4) JP 2002-097004 A
(5) JP-1985-200811 A
(6) U.S. Pat. No. 6,824,753
(7) JP 2004-182572 A Nonpatent Documents (1) T. Hagio, et al, Journal of material science Letters (J. Mater. Sci. Lett.), volume 16, page 795, 1997.
(2) D. Fister, Ceramic science and engineering proceedings (Ceram. Sci. Eng. Proc.), volume 6, page 1305, 1985.
(3) S. P. S. Arya, at al, Thin Solid Films, volume 157, page 267, 1988.
(4) J. Ecomomy, et al, Inorganic chemistry (Inorg. Chem.), volume 5, page 989, 1966.
(5) T. Matsuda, et al, Journal of material sciences (J. Mater. Sci.), volume 21, 649 pages, 1986.
(6) D. A. Lindquist, at al, Journal of American ceramic societies (J. Am. Ceram. Soc.), volume 74, page 3126, 1994.
(7) E. A. Pruss, et al, chemistry of Materials (Chem. Mater.), volume 12, page 19 page, 2000.
(8) Advance functional materials (Adv. Funct. Mater.), volume 15, No. 1, page 63, 2005.

What is claimed is:

1. A method of synthesizing spherical boron nitride nanoparticles comprising:
   heating a mixture of boric acid ester and nitrogen gas in ammonia gas and argon gas to form reaction product;
   crystallizing the reaction product to form a precursor of spherical boron nitride nanoparticles; and
   heating the precursor in inert gas.

2. The method of synthesizing spherical boron nitride nanoparticles set forth in claim 1, wherein the reaction product is presented in the form of $B(OCH_3)_{3-x}H_{3-x}N$ in which x is 2.7.

3. The method of synthesizing spherical boron nitride nanoparticles set forth in claim 2, wherein the crystallizing temperature is 50 degree C. or less.

4. Solid spherical boron nitride nanoparticles having an average particle diameter of less than 50 nm.

5. The solid spherical boron nitride nanoparticles set forth in claim 4, wherein the average particle diameter is less than 30 nm.

6. The solid spherical boron nitride nanoparticles set forth in claim 4 or claim 5, wherein oxygen content of the spherical boron nitride nanoparticles is less than 1 wt %.

7. Solid spherical boron nitride nanoparticles an average particle diameter of which is less than 50 nm, obtained by:
   heating a mixture of boric acid ester and nitrogen gas in ammonia gas and argon gas to form reaction product;
   crystallizing the reaction product to form a precursor of spherical boron nitride nanoparticles; and
   heating the precursor in inert gas.

8. The solid spherical boron nitride nanoparticles set forth in claim 7, wherein the average particle diameter of the spherical boron nitride nanoparticles is less than 30 nm.

9. The solid spherical boron nitride nanoparticles set forth in claim 7 or claim 8, wherein oxygen content of the spherical boron nitride nanoparticles is less than 1 wt %.

* * * * *